United States Patent
Michna et al.

(10) Patent No.: US 6,568,654 B1
(45) Date of Patent: May 27, 2003

(54) POSITIVE LOCKING VALVE CONTROL DEVICE

(75) Inventors: Mike Michna, North Huntingdon, PA (US); David E. Weckerly, Slippery Rock, PA (US)

(73) Assignee: Innovative Controls Inc., E. Pittsburgh, PA (US)

( * ) Notice: Subject to any disclaimer, the term of this patent is extended or adjusted under 35 U.S.C. 154(b) by 84 days.

(21) Appl. No.: 09/815,474

(22) Filed: Mar. 23, 2001

(51) Int. Cl.⁷ .............................................. F16K 31/44
(52) U.S. Cl. ...................................................... 251/100
(58) Field of Search .............................. 251/86, 95, 96, 251/100; 137/384.2, 384.6

(56) References Cited

U.S. PATENT DOCUMENTS

| | | | | |
|---|---|---|---|---|
| 676,221 A | * | 6/1901 | Davis | 251/86 X |
| 967,524 A | * | 8/1910 | Kellar | 251/100 |
| 1,379,927 A | * | 5/1921 | Kneass | 251/95 X |
| 1,742,495 A | * | 1/1930 | Converse | 251/100 X |
| 3,414,232 A | * | 12/1968 | Hellman | 251/86 |
| 3,602,245 A | * | 8/1971 | Meisel | 251/297 X |
| 4,946,130 A | * | 8/1990 | Kooiman | 251/100 X |
| 5,778,928 A | * | 7/1998 | Boland et al. | 251/100 X |

* cited by examiner

*Primary Examiner*—Ehud Gartenberg
*Assistant Examiner*—Eric Keasel
(74) *Attorney, Agent, or Firm*—Cohen & Grigsby, P.C.

(57) ABSTRACT

A mechanism used for locking a valve that provides positive control of the valve lock to prevent the valve from changing position unintentionally. The positive locking valve control device preferably comprises a push-pull rod having a toothed configuration that is engaged at different positions by a spring mechanism on the valve locking device in order to hold the push-pull rod and thereby the valve securely in place. To adjust the opening of the valve, the push-pull rod can be rotated by some predefined amount (such as 90 degrees) clockwise or counter-clockwise. This rotation frees the locking spring on the valve locking device from the teeth aligning it with a side of the push-pull rod thereby permitting linear movement of the rod to cause a corresponding adjustment in valve position. The rod is then "pushed in" or "pulled out" to adjust the size of the valve opening until the desired flow through the valve is obtained. Once the desired flow is achieved the push-pull rod is then rotated back through the predefined angle to its original position where the spring engages the teeth in the push-pull rod to prevent any further linear motion of the push-pull rod thereby effecting a lock of the valve at the selected position.

8 Claims, 4 Drawing Sheets

POSITIVE LOCKING VALVE CONTROL DEVICE

FIELD OF THE INVENTION

Figure 1:
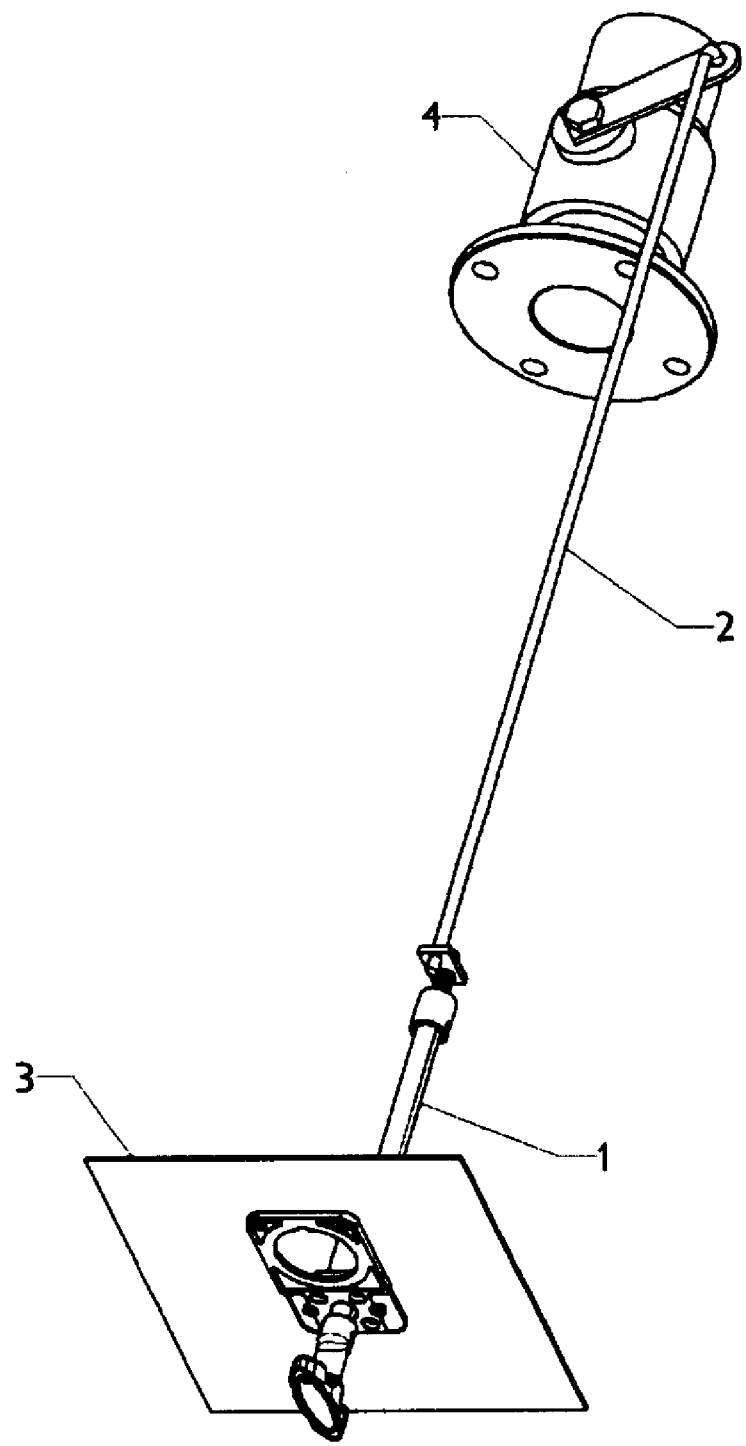
Figure 2:
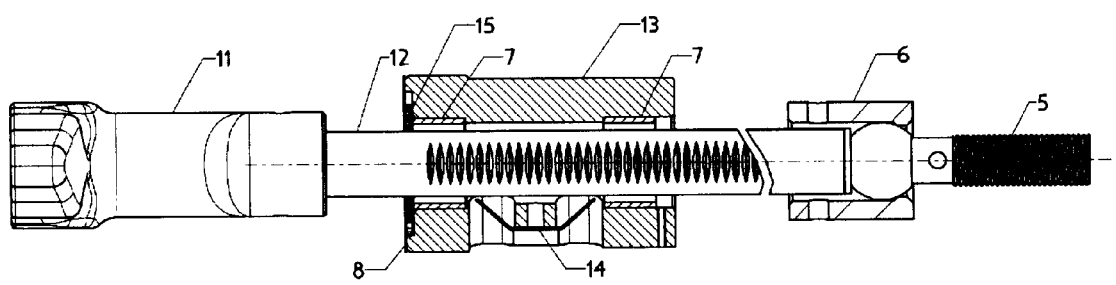
Figure 3:
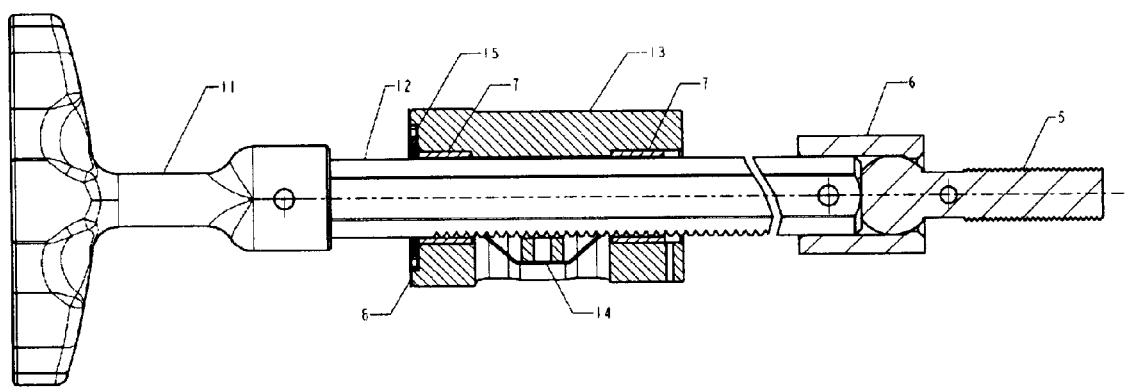
Figure 4:
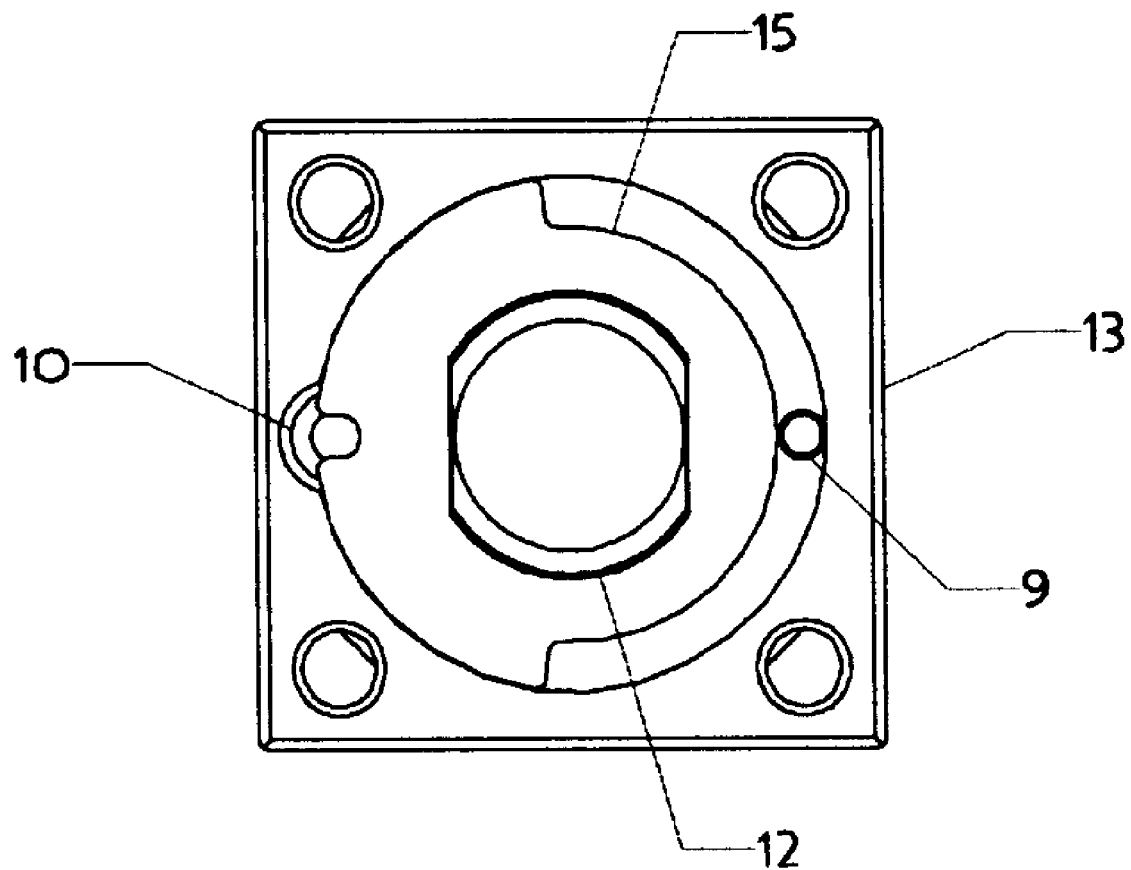

The present invention relates to a mechanism used for locking a valve that provides positive control of the valve lock. Preferably, the invention can be used to provide a positive locking mechanism to prevent the valve from changing position unintentionally.

BACKGROUND OF THE INVENTION

There exists a need for a valve locking mechanism that provides positive control of the valve lock. Such devices are particularly suited for use with water valves located on vehicles such as firetrucks in order to prevent the valve from changing position unintentionally while it is either in use or awaiting use. Preferably, such an invention can be used with an adjustment rod ("push-pull rod") to provide a positive locking mechanism which can be activated by the user to prevent the valve from changing position and then deactivated when it is desired to alter the valve position.

Current competing designs suffer from the problem that the push-pull rod is capable of "slipping" thereby permitting an alteration of the valve position. The present invention solves this problem by use of a valve locking mechanism that provides a positive barrier to push-pull rod movement which requires rotation of the push-pull rod by a certain predefined amount to defeat the barrier and thereby permit valve movement.

Accordingly, it is an object of the present invention to provide a positive valve locking mechanism to prevent the valve from changing position unintentionally.

It is another object of the present invention to provide a mechanism which is suited for use with water valves located on vehicles such as firetrucks in order to prevent the valve from changing position unintentionally while it is either in use or awaiting use.

It is another object of the present invention to provide a mechanism which can be used with an adjustment rod ("push-pull rod") to provide a positive locking mechanism which can be activated by the user to prevent the valve from changing position and then deactivated when it is desired to alter the valve position.

It is another object of the present invention to provide a valve locking mechanism that provides a positive barrier to push-pull rod movement which requires rotation of the push-pull rod by a certain predefined amount to defeat the barrier and thereby permit valve movement.

SUMMARY OF THE INVENTION

The positive locking valve control device of the present invention preferably comprises a push-pull rod having a toothed configuration that is engaged at different positions by a spring mechanism on the valve locking device in order to hold the push-pull rod and thereby the valve securely in place. To adjust the opening of the valve, the push-pull rod can be rotated by some predefined amount (such as 90 degrees) clockwise or counter-clockwise. This rotation frees the locking spring on the valve locking device from the teeth aligning it with a side of the push-pull rod thereby permitting linear movement of the rod to cause a corresponding adjustment in valve position. The rod is then "pushed in" or "pulled out" to adjust the size of the valve opening until the desired flow through the valve is obtained. Once the desired flow is achieved the push-pull rod is then rotated back through the predefined angle to its original position where the spring engages the teeth in the push-pull rod to prevent any further linear motion of the push-pull rod thereby effecting a lock of the valve at the selected position.

An improvement to the invention is the addition of a rotational limiter to the push-pull rod. The rotational limiter limits the rotation of the push-pull rod to a predefined amount (such as 90 degrees) from its normal locked position. This simplifies the operation of the invention by stopping the rotation at the optimal angle for linear adjustment. This is the angle where the spring provides no resistance to linear motion. This can preferably be accomplished by placing a pin in the main housing for the push-pull rod and using a limiter attached to the push-pull rod that comes into physical contact with the pin at the desired angle to provide a barrier to rod movement that prevents further rotation. The geometry of the limiter can take advantage of the preferred "double d" shape of the rod to prevent undesired rotation.

Another improvement to the invention is the addition of a spring loaded ball plunger to provide tactile feedback when the push-pull rod is returned to its normal locked position. This can be accomplished by placing a hole in the rotational limiter that lines up with the ball plunger when the rod is rotated to the locked position.

Another improvement to the invention is the addition of tactile feedback when the maximum rotation to the predefined valve angle (such as plus or minus 90 degrees) is reached. This again can be accomplished through use of the ball plunger by designing the geometry of the rotational limiter such that when the maximum rotation is reached the ball plunger extends itself in the opposite direction from its position when the valve is locked.

Another improvement to the invention is the addition of bushings to facilitate easier linear movement of the push-pull rod. This can be accomplished by providing bushings that fit between the push-pull rod and its main housing to provide a surface with less friction than would otherwise be experienced with metal-to-metal contact.

These and other advantages of the invention will become apparent from a perusal of the following detailed description of the presently preferred embodiments of the invention taken in connection with the accompanying drawings.

BRIEF DESCRIPTION OF THE DETAILED DRAWINGS

FIG. (1) shows the preferred embodiment of the positive locking valve control device of the present invention as attached to a valve.

FIG. (2) shows the preferred embodiment of the positive locking valve control device of the present invention in a free position.

FIG. (3) shows the preferred embodiment of the positive locking valve control device of the present invention in a locked position.

FIG. (4) shows the rotational limiter of the preferred embodiment of the positive locking valve control device of the present invention.

DETAILED DESCRIPTION OF THE PRESENTLY PREFERRED EMBODIMENTS

The parts of the positive locking valve control device of the present invention can be constructed of conventional strong lightweight durable metals, such as aluminum, stainless steel, or various synthetic materials such as fiberglass reinforced resins and thermoplastics. As configured in the preferred embodiment the device weighs less than 2 lbs.

FIG. (1) shows the preferred embodiment of the manual valve actuator 1 attached to a valve 4 by way of a mechanical linkage 2. In the preferred embodiment, the manual valve actuator 1 is affixed to a stationary panel 3 to provide an anchoring point. FIGS. (2) and (3) show the preferred components of the manual valve actuator 1. The two possible positions for manual valve actuator 1 are free and locked. FIG. (2) shows the manual valve actuator 1 in a free position that allows a push-pull rod 12 attached to a handle 11 on one end and to the valve linkage 2 on the other end to slide through a series of bushings 7 that are contained in a housing 13. In a free position, the operator can adjust the opening in the valve 4 to accommodate the desired flow by moving the push-pull rod 12 axially through the housing 13 such that the valve linkage 2 is moved to a position that fixes the opening in the valve 4 at a size which permits the desired flowrate. As shown in FIG. (3), the manual valve actuator 1 is put in the locked position by rotating the handle 11 by a predetermined amount (preferably 90°) from the free position shown in FIG. (2). In the locked position shown in FIG. (3), the toothed "double D" serrations in the preferred embodiment of push-pull rod 12 are engaged by the valve locking clip 14 at two points thereby preventing axial movement of the push-pull rod 12. There are serrations along the full length of the push-pull rod 12 to allow for its adjustment to any point within the full travel of the valve linkage 2.

FIG. (4) shows a preferred embodiment of the rotational limiter 15 of the manual valve actuator 1 in the locked position. The inside cross-sectional profile of the rotational limiter 15 matches the cross-section of the push-pull rod 12. The push-pull rod 12 can slide axially through the rotational limiter 15, however the rotational limiter 15 cannot rotate around the push-pull rod 12. In the locked position, a spring plunger 10 snaps into a groove in the rotational limiter 15. This allows the operator to feel the manual valve actuator 1 "snap" into the locked position. The manual valve actuator 1 can be put into a free position by rotating the handle 11 by the predefined amount (preferably 90°) in either direction whereby the spring plunger 10 retracts out of the groove in the rotational limiter 15 to allow simultaneous rotation of the push-pull rod 12 and rotational limiter 15. A hardened dowel pin 9 pressed into the housing 13 provides a mechanical stop for the rotation of the push-pull rod 12 by physical contact with an edge of the rotational limiter 15 when a free position has been reached. This provides the operator a positive stop to know when a free position has been reached to allow a valve adjustment to be made.

FIGS. (2) and (3) show other preferred components that provide additional optional functions for the manual valve actuator 1. Ball retainer 6 acts in conjunction with ball stud 5 to provide a pivoting ball joint when ball stud 5 is attached to the push-pull rod 12 to allow for misalignment between the valve 4 and manual valve actuator 1 as shown in FIG. (1). Wear plate 8 provides a barrier between the rotational limiter 15 and the mounting surface to prevent marring or galling of the panel 3 to which the manual valve actuator 1 is mounted.

Presently Preferred Method of Operation

The manual valve actuator 1 will typically be in the locked position when not in use whereby the serrations in push-pull rod 12 are engaged by the valve locking clip 14 to preventing axial movement of the push-pull rod 12 as long as spring plunger 10 is positioned in the groove in the rotational limiter 15. To adjust the valve position by using the manual valve actuator 1, the handle 11 is rotated by the predefined amount (preferably 90° in either direction) to overcome valve locking clip 14 engagement with the serrations in push-pull rod 12 until the stop is reached by engagement of the rotational limiter 15 with the dowel pin 9. The handle 11 is pushed or pulled axially to move valve linkage 2 via the push-pull rod 12 until the desired valve position is acquired. To lock the valve 4 in this position, the handle 11 is then rotated (preferably 90°) opposite to the previous rotation until the locked position is reached by the "snap" of the spring plunger 10 into the groove in the rotational limiter 15 whereby the valve locking clip 14 is reengaged with the serrations in push-pull rod 12. This adjustment can be done several times in succession and the valve 4 may be adjusted anywhere within the travel of the push-pull rod 12.

In this manner, the valve locking mechanism of the present invention provides positive control of the valve lock in order to prevent the valve from changing position unintentionally while it is either in use or awaiting use, which makes it particularly suited for use with valves delivering all types of fluids, especially valves delivering water or foam for firefighting applications and located on vehicles such as firetrucks.

While the invention has been described in connection with what are presently considered to be the preferred embodiments, it is to be understood the invention is not to be limited to the disclosed embodiments, but on the contrary is intended to cover various modifications and equivalent arrangements include within the spirit of the scope of the appended claims.

What is claimed is:

1. A valve locking device comprising:
   a. a rod coupled to a valve through a linkage that is configured to adjust an opening in the valve to a size that accommodates the desired flow through the valve upon movement of the rod;
   b. a locking mechanism configured to engage the rod at different positions within the full travel of the linkage in order to lock the valve in place;
   c. a limiting mechanism configured to limit rotation of the rod to a predefined angle from the locked position such that:
      (i) rotation of the rod through the predefined angle disengages the locking mechanism thereby permitting movement of the rod to cause an adjustment in valve position; and
      (ii) opposite rotation of the rod back through the predefined angle causes the locking mechanism to reengage the rod to prevent further motion thereby effecting a lock of the valve at the selected position;
   wherein the locking mechanism further comprises serrations along the length of the rod which are engaged at multiple points by a locking clip thereby preventing axial movement of the rod to lock the valve in position; and
   wherein the locking mechanism and the limiting mechanism are contained in a rod housing such that a cross-sectional profile of the limiting mechanism surrounds a matching cross-section of the rod to permit axial movement of the rod within the limiting mechanism when the locking mechanism is disengaged while preventing rotation of the limiting mechanism around the rod; and wherein a spring plunger snaps into a groove in the limiting mechanism to lock the valve in position and wherein rotation of the rod through the predefined angle retracts the spring plunger out of the groove to allow simultaneous rotation of the rod and the limiting mechanism.

2. The valve locking device of claim 1 wherein the limiting mechanism limits rotation of the rod to a 90 degree angle in either direction from the locked position.

3. The valve locking device of claim 1 further comprising a pivoting ball joint attached between the rod and the linkage to permit movement of the rod and to accommodate misalignment of the linkage with the valve.

4. The valve locking device of claim 1 wherein said device provides positive locking control of a valve in order to prevent the valve from changing position unintentionally while it is either in use or awaiting use.

5. The valve locking device of claim 1 further comprising a pin located in the rod housing that is configured to engage the limiting mechanism at the predefined angle to provide a barrier to rod movement that prevents further rotation.

6. The valve locking device of claim 1 further comprising a mechanism to provide an indication of:

a. the valve unlocked position by providing an indication when the rod is rotated to disengage the locking mechanism; and b. the valve locked position by providing a different indication when the rod is rotated to engage the locking mechanism.

7. The valve locking device of claim 6 wherein the indication mechanism comprises a spring-loaded ball plunger that provides an indication of:

a. the valve locked position by alignment of the ball plunger with an opening in the limiting mechanism when the rod is rotated to the locked position; and b. the valve unlocked position by extension of the ball plunger to a location opposed to the aligned position.

8. The valve locking device of claim 1 further comprising bushings located between the rod and the rod housing to permit axial movement of the rod when the valve locking mechanism is disengaged.

* * * * *